United States Patent
Saadoun et al.

(10) Patent No.: US 11,151,477 B2
(45) Date of Patent: Oct. 19, 2021

(54) TRAINING A CUSTOMER SERVICE SYSTEM

(71) Applicant: INTERNATIONAL BUSINESS MACHINES CORPORATION, Armonk, NY (US)

(72) Inventors: Gilad Mordechai Saadoun, Haifa (IL); Mordechai Nisenson, Kiryat Tivon (IL); Jonathan Bnayahu, Haifa (IL); Julian I. Kamil, Bethesda, MD (US); Brian Gamage, Canton, GA (US); John Tarcson, Pittsburgh, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 16/253,488

(22) Filed: Jan. 22, 2019

(65) Prior Publication Data

US 2020/0234182 A1 Jul. 23, 2020

(51) Int. Cl.
*G06Q 30/00* (2012.01)
*G06N 20/00* (2019.01)
*G06Q 40/08* (2012.01)
*G06Q 30/02* (2012.01)

(52) U.S. Cl.
CPC ......... *G06N 20/00* (2019.01); *G06Q 30/0242* (2013.01); *G06Q 30/0254* (2013.01); *G06Q 40/08* (2013.01)

(58) Field of Classification Search
CPC .................................... G06Q 30/0207–0277
See application file for complete search history.

(56) References Cited

U.S. PATENT DOCUMENTS

| | | | | |
|---|---|---|---|---|
| 7,778,850 B2 * | 8/2010 | Wester | ........... | G06Q 40/08 705/3 |
| 8,065,169 B1 * | 11/2011 | Oldham | ........... | G06Q 40/06 705/4 |
| 9,953,372 B1 * | 4/2018 | Dziabiak | ........... | G06Q 30/02 |
| 10,387,963 B1 * | 8/2019 | Leise | ........... | G06Q 40/08 |

(Continued)

OTHER PUBLICATIONS

Anonymous, Systems and Methods for Electronic Communications to Health Care Providers, IP.com, IPCOM000165500D, Dec. 17, 2007, pp. 1-18.

*Primary Examiner* — Luis A Brown
(74) *Attorney, Agent, or Firm* — Cantor Colburn LLP; Will Stock (57) ABSTRACT

A system for executing a code for training an insurance response system, comprising at least one hardware processor adapted to: using a plurality of insurance attribute values, extracted from a received insurance claim to retrieve: at least one inquiry related to the insurance claim and at least one inquiry result, and historical insurance data related to the insurance claim; computing a similarity value indicative of a difference between the at least one inquiry result and a claim result; identifying in the historical insurance data a plurality of insurance conditions relevant to the claim result and the at least one inquiry result; identifying at least one insurance condition effecting the similarity value by analyzing data comprising the at least one inquiry and the plurality of insurance conditions; and training a protocol model of an insurance response system using the at least one insurance condition and the at least one inquiry.

10 Claims, 4 Drawing Sheets

(56) References Cited

U.S. PATENT DOCUMENTS

| | | | | |
|---|---|---|---|---|
| 2008/0154651 A1* | 6/2008 | Kenefick | ............... | G06Q 40/08 705/4 |
| 2013/0317860 A1* | 11/2013 | Schumann, Jr. | ....... | G06Q 40/08 705/4 |
| 2014/0100865 A1* | 4/2014 | Beaton | .................. | G16H 40/20 705/2 |
| 2014/0279683 A1* | 9/2014 | Campbell | .............. | G06Q 40/06 705/36 R |
| 2014/0358591 A1* | 12/2014 | Gray | ..................... | G06N 20/00 705/4 |
| 2015/0213556 A1* | 7/2015 | Haller, Jr. | .............. | G06Q 40/08 705/4 |
| 2015/0324920 A1* | 11/2015 | Wilson | .................. | G06Q 40/08 705/4 |
| 2016/0232303 A1 | 8/2016 | Amit et al. | | |
| 2017/0286495 A1* | 10/2017 | Ott | .................... | G06F 16/24578 |
| 2018/0336636 A1* | 11/2018 | Jibowu | ................. | G06Q 40/06 |
| 2018/0336638 A1* | 11/2018 | Dziabiak | ............... | G06F 7/026 |
| 2018/0336639 A1* | 11/2018 | Dziabiak | ............... | G06Q 40/08 |
| 2018/0336640 A1* | 11/2018 | Dziabiak | ............. | G06F 16/2455 |
| 2019/0318420 A1* | 10/2019 | Summerson | ......... | G06Q 40/025 |
| 2020/0234182 A1* | 7/2020 | Saadoun | ............... | G06Q 40/08 |
| 2021/0142401 A1* | 5/2021 | Flowers | ............... | G06Q 30/016 |

* cited by examiner

TRAINING A CUSTOMER SERVICE SYSTEM

BACKGROUND

The present invention, in some embodiments thereof, relates to a customer service response system and, more specifically, but not exclusively, to an insurance response system.

It is common practice for an entity providing customer service to have one or more customer service protocols determining a workflow for processing a customer inquiry, as well as determining appropriate or recommended responses to input received from the customer. As used herein, the term entity refers to any entity that provides customer service, for example a commercial business entity and a government office. Some examples of an appropriate or recommended response are a recommended question to ask, a suggested resolution to the customer inquiry, and a wording of a response that is not legally compromising to the entity. There is an increase in use of computerized response systems when providing customer service, for example in a customer service call center. A computerized response system may be used when communicating with a customer to generate one or more responses to input received from the customer according to an entity's one or more customer service protocols.

There exist a variety of means for a customer to interact with a customer service system. For example, the customer may have a conversation with a customer service representative in person or over the phone, the customer may use an instant messaging application to communicate over a digital communication network with a customer service representative or an automated response system, and the customer may have a conversation with an automated voice response system. A customer may interact directly with a computerized response system, for example using a voice interface or an instant messaging application. A customer support representative may use a computerized response system when communicating with a customer in person, over the phone or via an instant messaging application, to generate one or more protocol messages to communicate to the customer in response to one or more customer messages received from the customer.

SUMMARY

It is an object of the present invention to provide a system and a method for training a customer service system.

The foregoing and other objects are achieved by the features of the independent claims. Further implementation forms are apparent from the dependent claims, the description and the figures.

According to a first aspect of the invention, a system for executing a code for training an insurance response system comprises at least one hardware processor adapted to: using a plurality of insurance attribute values, of a plurality of insurance attributes, extracted from a received insurance claim to retrieve: at least one inquiry related to the insurance claim and at least one inquiry result provided in response to the at least one inquiry, and insurance repository historical insurance data related to the insurance claim; computing a similarity value indicative of a difference between the at least one inquiry result and a claim result provided in response to the insurance claim; identifying in the historical insurance data a plurality of insurance conditions relevant to the claim result and the at least one inquiry result; identifying at least one insurance condition effecting the similarity value by analyzing data comprising the at least one inquiry and the plurality of insurance conditions; and training a protocol model of an insurance response system using the at least one insurance condition and the at least one inquiry.

According to a second aspect of the invention, a method for training an insurance response system comprises: using a plurality of insurance attribute values, of a plurality of insurance attributes, extracted from a received insurance claim to retrieve: at least one inquiry related to the insurance claim and at least one inquiry result provided in response to the at least one inquiry, and insurance repository historical insurance data related to the insurance claim; computing a similarity value indicative of a difference between the at least one inquiry result and a claim result provided in response to the insurance claim; identifying in the historical insurance data a plurality of insurance conditions relevant to the claim result and the at least one inquiry result; identifying at least one insurance condition effecting the similarity value by analyzing data comprising the at least one inquiry and the plurality of insurance conditions; and training a protocol model of an insurance response system using the at least one insurance condition and the at least one inquiry.

According to a third aspect of the invention, an insurance response system comprises at least one hardware processor adapted to execute a code for computing a new inquiry response to a new insurance inquiry by using a protocol model trained by at least one other hardware processor adapted to: using a plurality of insurance attribute values, of a plurality of insurance attributes, extracted from a received insurance claim to retrieve: at least one inquiry related to the insurance claim and at least one inquiry result provided in response to the at least one inquiry, and insurance repository historical insurance data related to the insurance claim; computing a similarity value indicative of a difference between the at least one inquiry result and a claim result provided in response to the insurance claim; identifying in the historical insurance data a plurality of insurance conditions relevant to the claim result and the at least one inquiry result; identifying at least one insurance condition effecting the similarity value by analyzing data comprising the at least one inquiry and the plurality of insurance conditions; and training the protocol model using the at least one insurance condition and the at least one inquiry.

With reference to the first and second aspects, in a first possible implementation of the first and second aspects of the present invention, the at least one inquiry has a plurality of inquiry attribute values of a plurality of inquiry attributes, and the plurality of inquiry attribute values match the plurality of insurance attribute values according to at least one inquiry matching test. Matching the plurality of inquiry attribute values to the plurality of insurance values may increase the relevance of the a least one inquiry to the insurance claim, and thus may improve accuracy of identifying the at least one insurance condition, facilitating an increase in accuracy of an output of the protocol model.

With reference to the first and second aspects, or the first implementation of the first and second aspects, in a second possible implementation of the first and second aspects of the present invention, the at least one inquiry comprises unformatted inquiry data, and the at least one hardware processor is further adapted to use at least one natural language processing method to extract at least some of the plurality of inquiry attribute values from the unformatted inquiry data. Using a natural language processing method may facilitate increasing accuracy of a match between the at least one inquiry and the insurance claim.

With reference to the first and second aspects, or the first implementation of the first and second aspects, in a third possible implementation of the first and second aspects of the present invention, the at least one hardware processor is adapted to retrieve the at least one inquiry by inputting the plurality of insurance attribute values and the plurality of inquiry attribute values to an inquiry classification model.

With reference to the first and second aspects, in a fourth possible implementation of the first and second aspects of the present invention, the plurality of insurance conditions comprises a plurality of historical insurance attribute values of the plurality of insurance attributes, and the plurality of historical insurance attribute values match the plurality of insurance attribute values according to at least one insurance data matching test. Matching the plurality of historical insurance attribute values to the plurality of insurance values may increase the relevance of the historical insurance data to the insurance claim, and thus may improve accuracy of identifying the at least one insurance condition, facilitating an increase in accuracy of an output of the protocol model.

With reference to the first and second aspects, in a fifth possible implementation of the first and second aspects of the present invention, analyzing the data comprising the at least one inquiry and the plurality of insurance conditions comprises analyzing a temporal arrangement of the at least one inquiry and the plurality of insurance conditions. Using a temporal arrangement may improve accuracy of identifying the at least one insurance condition, facilitating an increase in accuracy of an output of the protocol model.

With reference to the first and second aspects, in a sixth possible implementation of the first and second aspects of the present invention, the similarity value indicates there is no difference between the at least one inquiry result and the claim result. Training the protocol model when the similarity value indicates there is no difference between the at least one inquiry result and the claim result may increase accuracy of an output of the protocol model by reinforcing one or more steps of a customer service policy that contributed to the at least one inquiry result.

With reference to the third aspect, in a first possible implementation of the third aspect of the present invention, computing the new inquiry response comprises: receiving the new insurance inquiry; inputting the insurance inquiry into the protocol model; in each of a plurality of iteration: computing a protocol message to output, using the protocol model; outputting the protocol message; receiving a message response to the protocol message; and inputting the message response to the protocol model; computing a protocol inquiry response using the protocol model; and using the protocol inquiry response as the new inquiry response. Using a protocol model trained according to the present invention to compute a protocol message to output may increase accuracy of the computed new inquiry response.

With reference to the third aspect, in a second possible implementation of the third aspect of the present invention, the at least one hardware processor is further adapted to output the protocol inquiry response on at least one output device connected to the at least one hardware processor and selected from a group of output devices consisting of: a visual display device, an audio device, a hand held mobile output device, and a digital communication network output adapter. Optionally, the at least one hardware processor is further adapted to output the protocol message on the at least one output device. Optionally, the new insurance inquiry is received via at least one input device connected to the at least one hardware processor and selected from a group of input devices consisting of: a digital communication network input adapter, a keyboard, a touch screen, a hand held mobile input device, and a microphone. Optionally, the message response is received via the at least one input device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to a customer service response system and, more specifically, but not exclusively, to an insurance response system.

Some customer inquiries to a customer service response system are regarding a possible outcome of a future interaction with the entity. For example, when the entity is an insurance company, a customer may inquire regarding an expected outcome of an insurance claim. In this case the future interaction may be filing an insurance claim. In another example, when the entity is a hotel, a customer may inquire regarding an expected cost of a room reservation. In this case the future interaction may be placing a reservation for a room. It may be the case that when the future interaction with the entity occurs, an outcome of the future interaction is different from a result of the customer's inquiry. For example, a customer may receive a result that a future insurance claim is eligible for compensation; however when the customer files the insurance claim the outcome of the claim is denial of compensation. In another example, a customer may receive a result that a cost of a reservation is an identified amount of money; however when the customer makes the reservation the price is increased.

A difference between an expected outcome of the future interaction, as given in the result to the customer's inquiry, and an outcome of the future interaction may cause customer dissatisfaction, possibly leading to a damaged reputation. An entity typically would like to avoid customer dissatisfaction as ultimately it may cause a reduction in the entity's profits due to losing the customer, and additionally or alternately losing other existing and potential customers due to a damaged reputation. In addition, addressing a customer's complaint about a difference between the expected outcome according to the result of the customer's inquiry and the outcome of the future interaction adds work load to the customer support service, increasing costs of operation due to costs of additional resources to handle such a complaint.

Some differences between the expected outcome according to the result of the customer's inquiry and the outcome of the future interaction are caused by one or more business conditions. For example, a price of a hotel reservation may be higher than a reservation price given in response to an inquiry due to the customer reserving a larger room than the customer inquired about, or reserving a room for an actual date different than a date inquired about. In another example, after receiving a response confirming eligibility for a refund for a first insurance claim, a customer may have filed one or more other claims prior to filing the first insurance claim, exceeding a refund limit such that when the first insurance claim is filed the customer is no longer eligible for a refund.

A customer service protocol may comprise a plurality of steps, each comprising one or more possible questions to ask the customer or one or more possible responses to give the customer. Optionally, a possible question has a question text. Optionally, a possible response has a response text. A response text may comprise one or more words in a natural language. A response text optionally comprises one or more consecutive characters representing an identified symbol, for example a smiley face or a V sign which may indicate confirmation. There is a need to adapt the entity's one or more customer support protocols to mitigate differences between a response to a customer inquiry and a result of a customer's interaction with the entity. For example, changing a possible response in a step of a customer service protocol may result in fewer differences between the response to the customer inquiry and the result of the customer's interaction with the entity. Another possible change to a customer service protocol is changing a recommended response text in another step of the customer service protocol.

To identify the one or more business conditions causing one or more differences between a result of a customer's inquiry and an outcome of a customer's interaction with the entity there is a need to correctly identify one or more customer inquiries related to the customer's interaction with the entity. Some information describing an inquiry may be unstructured digital information, for example a digital audio recording of a conversation between the customer and a customer support representative, a free text transcription of the conversation, and a recording of an instant messaging application conversation. There may be a need to analyze the unstructured digital information in order to identify the one or more customer inquiries related to the customer's interaction with the entity.

The present invention proposes, in some embodiments thereof, training a protocol model according to a similarity between at least one inquiry result, provided in response to at least one inquiry, and an interaction result, provided in response to a customer interaction. In such embodiments, the present invention proposes computing a similarity score indicative of a difference between the interaction result and the at least one inquiry result, identifying at least one business condition effecting the similarity score, and training a protocol model using the at least one business condition and the at least one inquiry. Training the protocol model using the at least one business condition and the at least one inquiry may facilitate reducing cost of operation of a customer support service by reducing an amount of differences between a result of a customer interaction and a result of a related inquiry. Optionally, the at least one business condition is identified in a plurality of business conditions relevant to the interaction result and the at least one inquiry result. The present invention further proposes, in some embodiments of the present invention, retrieving historical business data related to the customer interaction and retrieving the at least one inquiry such that the at least one inquiry is related to the customer interaction. Optionally, a plurality of business attribute values of a plurality of business attributes, extracted from the customer interaction, are used for retrieving the historical business data and the at least one inquiry. Optionally the historical business data comprises the plurality of business conditions. Some examples of a business attribute are a name of a customer, an insurance policy identifier, a date of filing a claim, a date of making a reservation, a type of room, and a requested reservation date. Another example of a business attribute is a type of insurance claim, for example whether an insurance claim is for a doctor's visit or a laboratory test. Some examples of a business condition are a hotel rate schedule, an insurance policy expiration date, an individual insurance refund limit, and a family insurance refund limit. Using the plurality of business attribute values to retrieve the at least one inquiry related to the customer interaction and historical business data related to the customer interaction may facilitate accurate identification of the at least one business condition, increasing robustness of the trained protocol model which may facilitate reducing cost of operation of the customer support service.

According to some embodiments of the present invention, the at least one inquiry matches the customer interaction according to at least one inquiry matching test applied to the plurality of business attribute values and a plurality of inquiry attribute values of a plurality of inquiry attributes of the at least one inquiry. Some examples of an inquiry attribute are an inquiry date, a name of an inquiring customer, a potential reservation data, and a type of insurance claim. An example of an inquiry matching test is a date of inquiry value preceding an interaction date value. Optionally, at least one natural language processing method is used to extract at least some of the plurality of inquiry attribute values from unstructured digital data of the at least one inquiry. Using a natural language processing method to extract the at least one inquiry attribute values may facilitate accurate retrieval of the at least one related inquiry, which may lead to accurate identification of the at least one business condition, increasing robustness of the trained protocol model which may facilitate reducing cost of operation of the customer support service.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following description focuses on a non-limiting use of the present invention in an insurance response system; however the present invention may be used in other business response systems.

Figure 1:
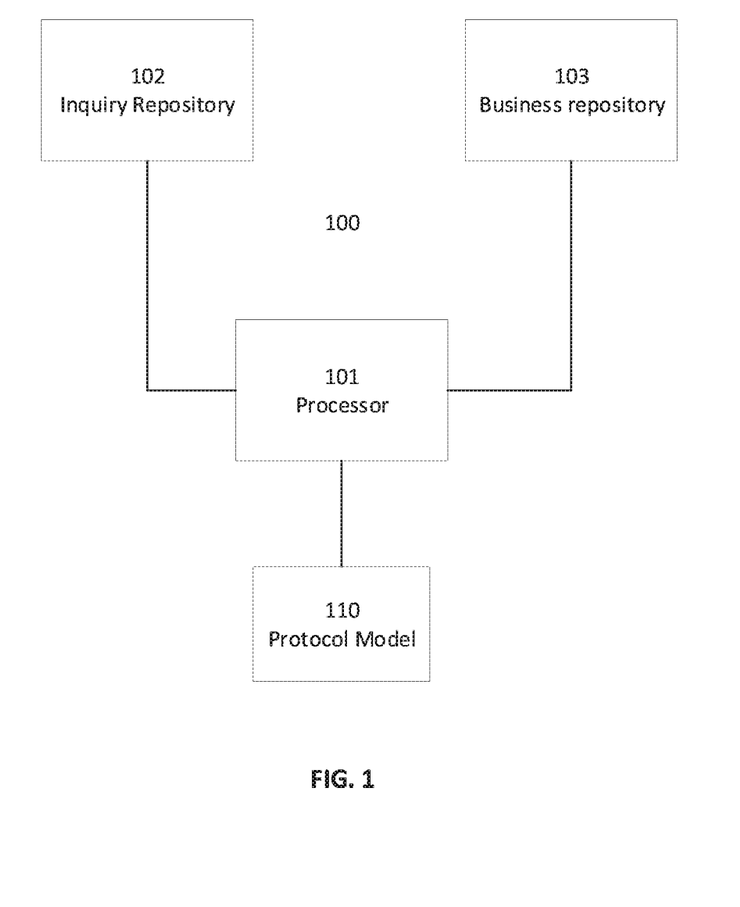
FIG. 1 is a schematic block diagram of an exemplary system for training a business response system, according to some embodiments of the present invention.

Reference is now made to FIG. 1, showing a schematic block diagram of an exemplary system 100 for training a business response system, according to some embodiments of the present invention. In such embodiments, at least one hardware processor 101 is connected to at least one inquiry repository 102, and at least one business repository 103. An example of an inquiry repository is an insurance inquiry repository, storing inquiry data related to a plurality of historical inquiries to an insurance response system. Optionally, the historical inquiry data comprises a plurality of inquiry attribute values, each of one of a plurality of inquiry attributes. Some examples of an inquiry attribute are: a policy-holder identifier, a service type, a mechanical procedure type, a medical procedure type, a diagnosis, a place of service, a network status, a provider, a date of inquiry, a time of inquiry, an eligibility inquiry response, and a liability inquiry response. Optionally, the inquiry data comprises unformatted inquiry data. Optionally, the unformatted inquiry data comprises at least some of the plurality of inquiry attribute values. Optionally, at least one hardware processor 101 is connected to at least one inquiry repository 102 via a first digital communication network. Some examples of a digital communication network are a Local Area Network (LAN), such as an Ethernet network and a wireless network, and a Wide Area Network (WAN), such as the Internet. Optionally, at least one inquiry repository 102 is a database. An example of a business repository is an insurance repository, storing historical insurance data related to a plurality of insurance claims and additionally or alternatively related to a plurality of insurance policies. For example, historical insurance data may comprise a plurality of insurance values each of one of a plurality of insurance attributes. Some examples of an insurance attribute are: a policy-holder identifier, a date of claim, a time of claim, an insurance policy identifier, an eligibility insurance response, a liability insurance response, and an amount of money. Optionally, at least one hardware processor 101 is connected to at least one business repository 103 via a second digital communication network, for example a LAN or a WAN. Optionally, the second digital communication network is the first digital communication network. Optionally, at least one business repository 103 is a database.

Optionally, at least one hardware processor 101 is connected to at least one protocol model 110 of a response system, for the purpose of training the protocol model. Optionally, protocol model 110 is a protocol model of an insurance response system. Optionally, at least one hardware processor executed at least one protocol model 110 for the purpose of training at least one protocol model 110. Optionally, protocol model 110 is a machine learning model. Optionally, protocol model 110 is a neural network. Optionally, protocol model 110 is executed by at least one other hardware processor connected to at least one hardware processor 101 via a third digital communication network, for example a LAN or a WAN.

To train protocol model 110, in some embodiments of the present invention system 100 executes on at least one hardware processor 101 code implementing the following optional method.

Figure 2:
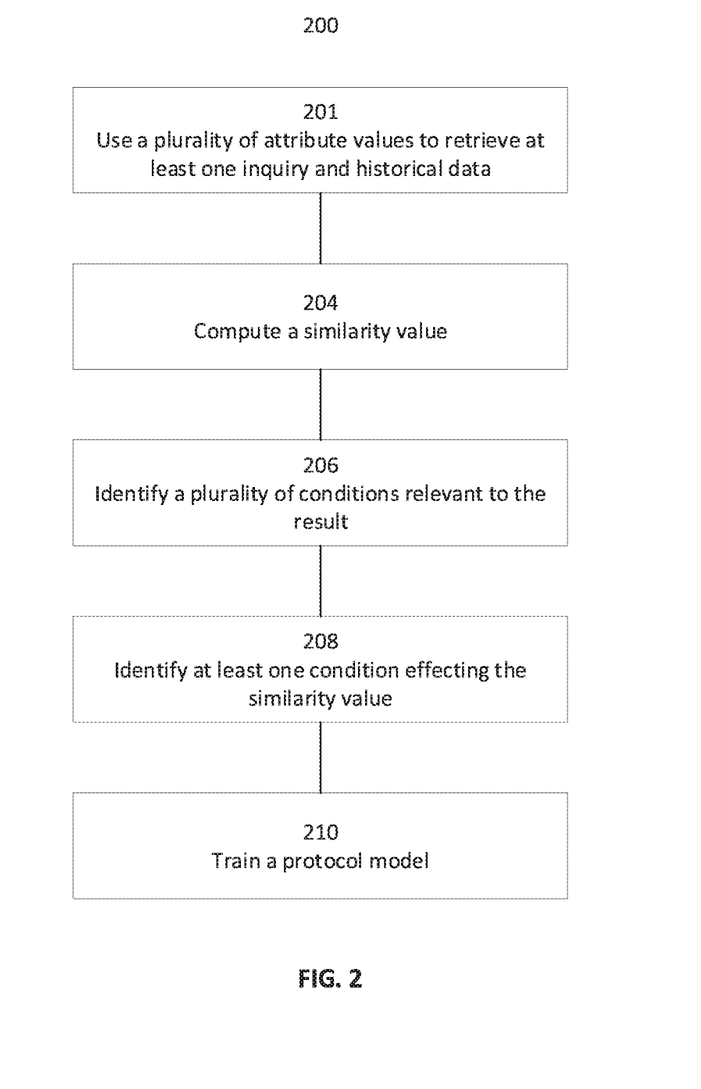
FIG. 2 is a flowchart schematically representing an optional flow of operations for training a business response system, according to some embodiments of the present invention.

Reference is now made also to FIG. 2, showing a flowchart schematically representing an optional flow of operations 200 for training a business response system, according to some embodiments of the present invention. In such embodiments, at least one hardware processor 101 receives a business interaction, for example an insurance claim, and as shown at block 201, optionally uses a plurality of business attribute values to retrieve at least one inquiry related to the business interaction, at least one inquiry result provided in response to the at least one inquiry, and business repository historical business data related to the business interaction, for example historical insurance data related to the insurance claim. Optionally, at least one hardware processor 101 receives the business interaction via a fourth digital communication network, for example a LAN or a WAN. Optionally, at least one hardware processor 101 receives the business interaction from at least one business repository 103. Optionally, at least one hardware processor 101 retrieves the business repository historical business data from business repository 103. Optionally, the plurality of business attribute values are of a plurality of business attributes and are extracted from the received business interaction. For example, when the business interaction is the insurance claim, the plurality of business attribute values are optionally a plurality of insurance attribute values of a plurality of insurance attributes.

Optionally, the at least one inquiry has a plurality of inquiry attribute values of a plurality of inquiry attributes. Optionally, the at least one inquiry comprises unformatted inquiry data. Optionally, at least one hardware processor 101 uses at least one natural language processing methods to extract at least some of the plurality of inquiry attribute values from the unformatted inquiry data. Optionally, the unformatted inquiry data comprises free text encoded using a text encoding method, and at least one hardware processor 101 optionally applies the at least one natural language processing methods to the free text. Optionally, the unformatted inquiry data comprises one or more audio recordings of at least part of a conversation between a customer service representative and a customer, and at least one hardware processor 101 optionally applies the at least one natural language processing methods to the one or more audio recordings. Optionally, the plurality of inquiry attribute values match the plurality of business attribute values according to at least one inquiry matching test. For example, when the business interaction is an insurance claim and at least one inquiry repository 102 is an insurance inquiry repository, a time of inquiry value of the at least one inquiry may be earlier than a time of claim of the insurance claim. Optionally, at least one hardware processor 101 inputs the plurality of business attribute values and the plurality of inquiry attribute values to an inquiry classification model, for the purpose of retrieving the at least one inquiry. Optionally, an output of the inquiry classification model, regarding in response to inputting a first plurality of inquiry attribute values extracted from a first inquiry, is used to determine whether to add the first inquiry to the at least one inquiry retrieved from at least one inquiry repository 102.

As shown at block 204, at least one hardware processor 101 optionally computes a similarity value indicative of a difference between the at least one inquiry result and a business result provided in response to the business interaction. For example, at least one hardware processor 101 may compute a similarity value indicative of a difference between at least one inquiry result and a claim result provided in response to an insurance claim, such as a difference between a first liability value of an inquiry result and a second liability value of the claim result. Optionally, the similarity value indicates there is no difference between the at least one inquiry result and the claim result, for example when the first liability value of the inquiry result is equal to the second liability value of the claim result.

As shown at block 206, at least one hardware processor 101 optionally identifies in the historical business data a plurality of business conditions relevant to the business interaction results and the at least one inquiry result. For example, when the business interaction is the insurance claim, at least one hardware processor 101 may identify in the historical insurance data a plurality of insurance conditions relevant to the claim result and the at least one inquiry result, such as a liability limit value, a first aggregated compensation value paid until a time of the at least one inquiry, and a second aggregated compensation value paid until a time of the insurance claim. It may be the case that some inquiry attribute values of the plurality of inquiry attribute values are related to some business condition. For example, a response text in response to an insurance inquiry may be selected according to an insurance condition related to a customer's gender, such as a male customer is not eligible for a pregnancy test. Such a relationship between some of the inquiry attribute values and some business conditions may facilitate more accurate identification of the plurality of business conditions relevant to the at least one inquiry result than when no such relationship exists. As shown at block 208, at least one hardware processor 101 optionally identifies at least one business condition effecting the similarity value computed in 204. Optionally, at least one hardware processor 101 identifies the at least one business condition effecting the similarity value by analyzing data comprising the at least one inquiry and the plurality of business conditions. For example, when the business interaction is the insurance claim, at least one hardware processor 101 may analyze data comprising the at least one inquiry and the plurality of insurance conditions to identify at least one insurance condition effecting the similarity value indicating a difference between the at least one inquiry result and the claim result. Optionally, the plurality of business conditions comprises a plurality of historical business attribute values of the plurality of business values. For example, when the business interaction is an insurance claim the plurality of business attributes is the plurality of insurance attributes, the plurality of business conditions may be a plurality of insurance conditions, and the plurality of insurance conditions optionally comprises a plurality of historical insurance attribute values of the plurality of insurance attributes. Optionally, the plurality of historical business attribute values match the plurality of business attribute values according to at least one business data matching test. For example, a first claim date value in the historical business attribute values may be earlier than a second claim date of the insurance claim and later than an inquiry date of the at least one inquiry. Optionally, analyzing the data comprising the at least one inquiry and the plurality of business conditions comprises analyzing a temporal arrangement of the at least one inquiry and the plurality of insurance conditions. Optionally, the plurality of business conditions comprises one or more compliance result values computed by applying one or more compliance tests to at least some of the plurality of historical business attribute values, and identifying the at least one business condition optionally comprises identifying at least one of the one or more compliance tests.

As shown at block 210, at least one hardware processor 101 optionally trains protocol model 110 using the at least one business condition and the at least one inquiry, for example using the at least one insurance condition and the at least one inquiry. Training the protocol model optionally comprises training one step in a customer service protocol. Optionally, training the protocol model comprises training one or more steps in the customer service protocol. When the similarity score indicates a difference between the interaction result and the at least one inquiry result, training the protocol model may change one or more steps in the customer service protocol. When the similarity score indicates there is no difference between the interaction result and the at least one inquiry result, training the protocol model may reinforce one or more other steps of the at least one inquiry.

In some embodiments of the present invention, protocol model 110 trained by system 100 is used in a business response system.

Figure 3:
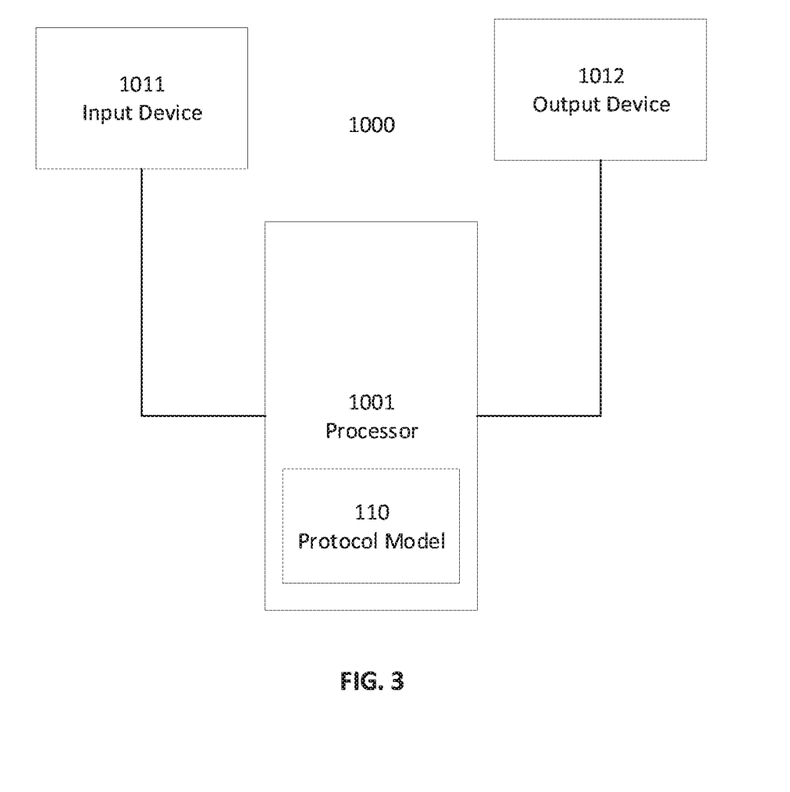
FIG. 3 is a schematic block diagram of an exemplary business response system, according to some embodiments of the present invention.

Reference is now made also to FIG. 3, showing a schematic block diagram of an exemplary business response system 300, according to some embodiments of the present invention. In such embodiments, at least one hardware processor 1001 uses protocol model 110, trained by system 100. Optionally, at least one hardware processor 1001 executes protocol model 110.

Optionally, at least one hardware processor 1001 is connected to at least one input device 1011 for the purpose of receiving at least one new inquiry. Some examples of an input device are a keyboard, a microphone, a touch screen, a hand held mobile device, and a digital communication network adapter. At least one input device 1011 is optionally electrically connected to at least one hardware processor 1001, for example a keyboard, a microphone and a touch screen. Optionally, at least one input device 1011 is connected to at least one hardware processor 1001 via an input digital communication network adapter electrically connected to at least one hardware processor 1001, for example for the purpose of receiving the new inquiry via an input digital communication network such as a LAN or a WAN.

Optionally, at least one hardware processor 1001 is connected to at least one output device 1012 for the purpose of outputting one or more protocol messages and additionally or alternately for the purpose of outputting an inquiry response in response to the new inquiry. Some examples of an output device are a visual display device such as a monitor or a screen, an audio device such as a speaker, a hand held mobile device, and a digital communication network adapter. At least one output device 1012 is optionally electrically connected to at least one hardware processor 1001, for example a monitor or a speaker. Optionally, at least one output device 1012 is connected to at least one hardware processor 1001 via an output digital communication network adapter electrically connected to at least one hardware processor 1001, for example for the purpose of outputting a response to the new inquiry via an output digital communication network such as a LAN or a WAN. Optionally the output digital communication network is the input communication network.

To compute a new inquiry response to a new insurance inquiry, in some embodiments of the present invention, system 1000 executes inquiry processing code implementing the following optional method.

Figure 4:
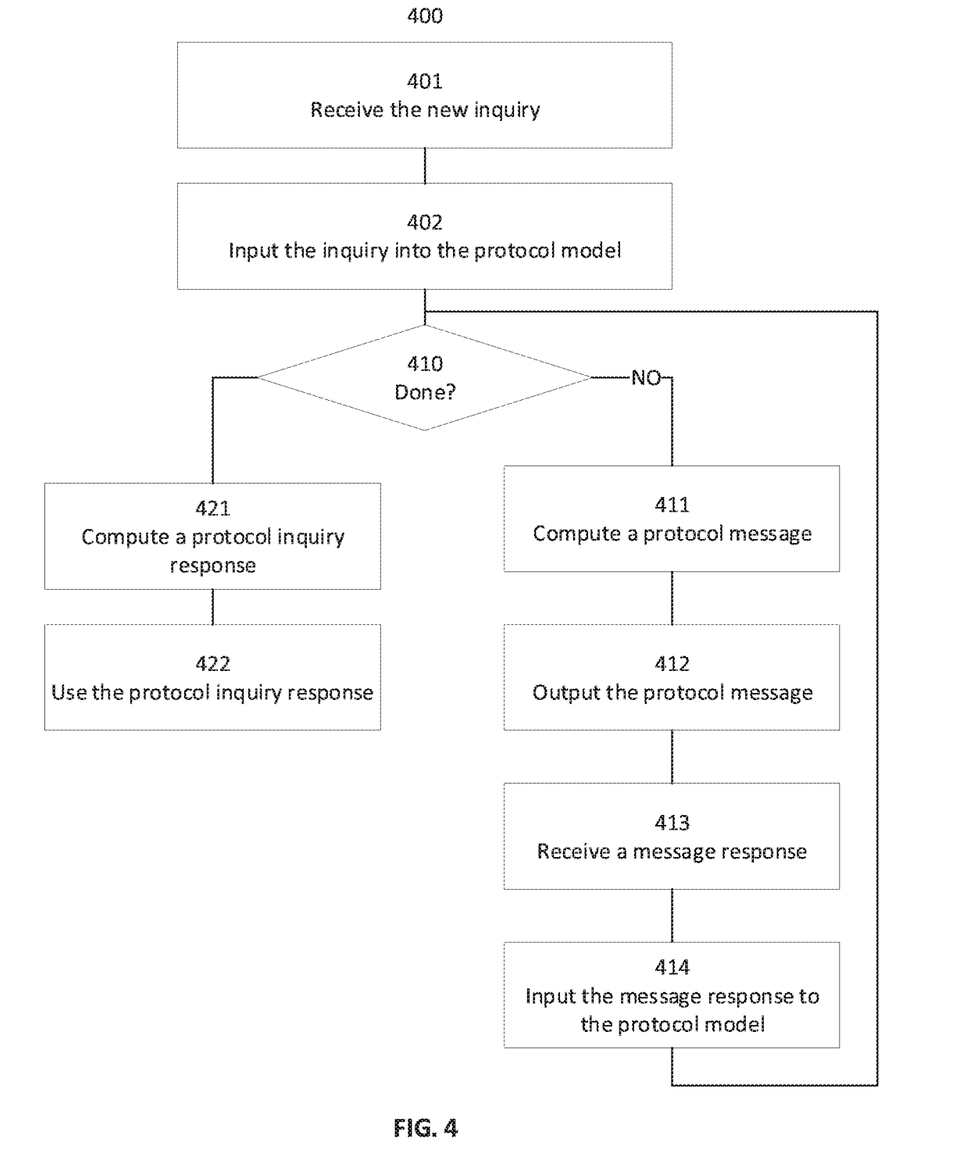
FIG. 4 is a flowchart schematically representing an optional flow of operations for a business response system, according to some embodiments of the present invention.

Reference is now made also to FIG. 4, showing a flowchart schematically representing an optional flow of operations 400 for a business response system, according to some embodiments of the present invention. In such embodiments, as shown at block 401 at least one hardware processor 1001 receives the new inquiry via at least one input device 1011 and as shown at block 402 optionally inputs the new inquiry into the protocol model. Optionally, the new inquiry is a new insurance inquiry. In each of a plurality of iterations, at least one hardware processor 1001 optionally computes as shown at block 411, optionally using protocol model 110, a protocol message to output and as shown at block 412 optionally outputs the protocol message using at least one output device 1012. Examples of a protocol message are a statement and a question. As shown at block 413 at least one hardware processor 1001 optionally receives a message response to the protocol message, optionally via at least one input device 1011. As shown at block 414, at least one hardware processor optionally inputs the message response to protocol model 110. Optionally, at least one hardware processor 1001 determines as shown at decision block 410 that processing is done. When processing is done, at least one hardware processor 1001 optionally computes as shown at block 421 a protocol inquiry response, optionally using protocol model 110. For example, when the new inquiry is a new insurance inquiry, at least one hardware processor 1001 may compute as shown at block 421 an inquiry response comprising an eligibility inquiry response. Optionally, as shown at block 422 at least one hardware processor 1001 uses the protocol inquire response as the new inquiry response. Optionally at least one hardware processor 1001 outputs the new inquiry response using at least one output device 1012.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant natural language processing methods will be developed and the scope of the natural language processing method is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for computing a new inquiry response to a new insurance inquiry by using a trained protocol model, comprising:
   at least one hardware processor adapted to:
      using a plurality of insurance attribute values, of a plurality of insurance attributes, extracted from a received insurance claim to retrieve:
         at least one inquiry related to the insurance claim and at least one inquiry result provided in response to the at least one inquiry, and
         insurance repository historical insurance data related to the insurance claim;
      computing a difference between the at least one inquiry result and a claim result provided in response to the insurance claim;
      identifying in the historical insurance data a plurality of insurance conditions relevant to the claim result and the at least one inquiry result;
      identifying at least one insurance condition effecting the difference by analyzing data comprising the at least one inquiry and the plurality of insurance conditions, wherein the plurality of insurance conditions include a liability limit value, a first aggregated compensation value paid prior to a time of the at least one inquiry, and a second aggregated compensation value paid prior to a time of the insurance claim; and
      training the protocol model of an insurance response system using the at least one insurance condition and the at least one inquiry, and
   computing the new inquiry response by:
      receiving the new insurance inquiry;
      inputting the insurance inquiry into the protocol model;
      in each of a plurality of iterations:
         computing a protocol message to output, using the protocol model;
         outputting the protocol message;
         receiving a message response to the protocol message; and
         inputting the message response to the protocol model;
         computing a protocol inquiry response using the protocol model; and
         using the protocol inquiry response as the new inquiry response.

2. The system of claim 1, wherein the at least one inquiry has a plurality of inquiry attribute values of a plurality of inquiry attributes; and
   wherein the plurality of inquiry attribute values match the plurality of insurance attribute values according to at least one inquiry matching test.

3. The system of claim 2, wherein the at least one inquiry comprises unformatted inquiry data; and
   wherein the at least one hardware processor is further adapted to use at least one natural language processing method to extract at least some of the plurality of inquiry attribute values from the unformatted inquiry data.

4. The system of claim 2, wherein the at least one hardware processor is adapted to retrieve the at least one inquiry by inputting the plurality of insurance attribute values and the plurality of inquiry attribute values to an inquiry classification model.

5. The system of claim 1, wherein the plurality of insurance conditions comprises a plurality of historical insurance attribute values of the plurality of insurance attributes; and
   wherein the plurality of historical insurance attribute values match the plurality of insurance attribute values according to at least one insurance data matching test.

6. The system of claim 1, wherein analyzing the data comprising the at least one inquiry and the plurality of insurance conditions comprises analyzing a temporal arrangement of the at least one inquiry and the plurality of insurance conditions.

7. A method for computing a new inquiry response to a new insurance inquiry by using a trained protocol model, comprising:
   using a plurality of insurance attribute values, of a plurality of insurance attributes, extracted from a received insurance claim to retrieve:

at least one inquiry related to the insurance claim and at least one inquiry result provided in response to the at least one inquiry, and insurance repository historical insurance data related to the insurance claim;

computing a difference between the at least one inquiry result and a claim result provided in response to the insurance claim;

identifying in the historical insurance data a plurality of insurance conditions relevant to the claim result and the at least one inquiry result;

identifying at least one insurance condition effecting the difference by analyzing data comprising the at least one inquiry and the plurality of insurance conditions, wherein the plurality of insurance conditions include a liability limit value, a first aggregated compensation value paid prior to a time of the at least one inquiry, and a second aggregated compensation value paid prior to a time of the insurance claim;

training the protocol model of an insurance response system using the at least one insurance condition and the at least one inquiry, and computing the new inquiry response by:
  receiving the new insurance inquiry;
  inputting the insurance inquiry into the protocol model;
  in each of a plurality of iterations:
    computing a protocol message to output, using the protocol model;
    outputting the protocol message;
    receiving a message response to the protocol message; and
    inputting the message response to the protocol model;
    computing a protocol inquiry response using the protocol model; and
    using the protocol inquiry response as the new inquiry response.

8. An insurance response system comprising at least one hardware processor adapted to execute a code for computing a new inquiry response to a new insurance inquiry by using a protocol model trained by at least one other hardware processor adapted to:

using a plurality of insurance attribute values, of a plurality of insurance attributes, extracted from a received insurance claim to retrieve:
  at least one inquiry related to the insurance claim and at least one inquiry result provided in response to the at least one inquiry, and
  insurance repository historical insurance data related to the insurance claim;

computing a difference between the at least one inquiry result and a claim result provided in response to the insurance claim;

identifying in the historical insurance data a plurality of insurance conditions relevant to the claim result and the at least one inquiry result;

identifying at least one insurance condition effecting the difference by analyzing data comprising the at least one inquiry and the plurality of insurance conditions, wherein the plurality of insurance conditions include a liability limit value, a first aggregated compensation value paid prior to a time of the at least one inquiry, and a second aggregated compensation value paid prior to a time of the insurance claim; and training the protocol model using the at least one insurance condition and the at least one inquiry, wherein computing the new inquiry response comprises:
  receiving the new insurance inquiry;
  inputting the insurance inquiry into the protocol model;
  in each of a plurality of iterations:
    computing a protocol message to output, using the protocol model;
    outputting the protocol message;
    receiving a message response to the protocol message; and
    inputting the message response to the protocol model;
    computing a protocol inquiry response using the protocol model; and
    using the protocol inquiry response as the new inquiry response.

9. The system of claim 8, wherein the at least one hardware processor is further adapted to output the protocol inquiry response on at least one output device connected to the at least one hardware processor and selected from a group of output devices consisting of: a visual display device, an audio device, a hand held mobile output device, and a digital communication network output adapter;

and wherein the at least one hardware processor is further adapted to output the protocol message on the at least one output device.

10. The system of claim 8, wherein the new insurance inquiry is received via at least one input device connected to the at least one hardware processor and selected from a group of input devices consisting of: a digital communication network input adapter, a keyboard, a touch screen, a hand held mobile input device, and a microphone; and wherein the message response is received via the at least one input device.

* * * * *